Aug. 31, 1954 H. H. KLACKNER 2,687,784
LUBRICANT COOLING FOR GEAR SETS
Filed May 31, 1951 2 Sheets-Sheet 1

Inventor
HERMAN H. KLACKNER
By
Miles Kenninger
Attorney

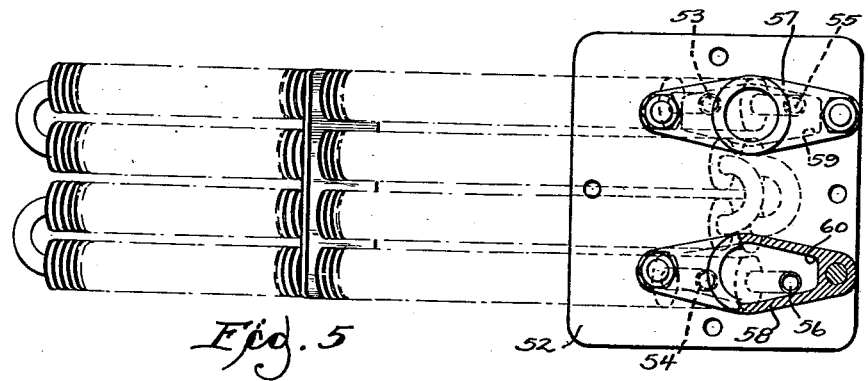
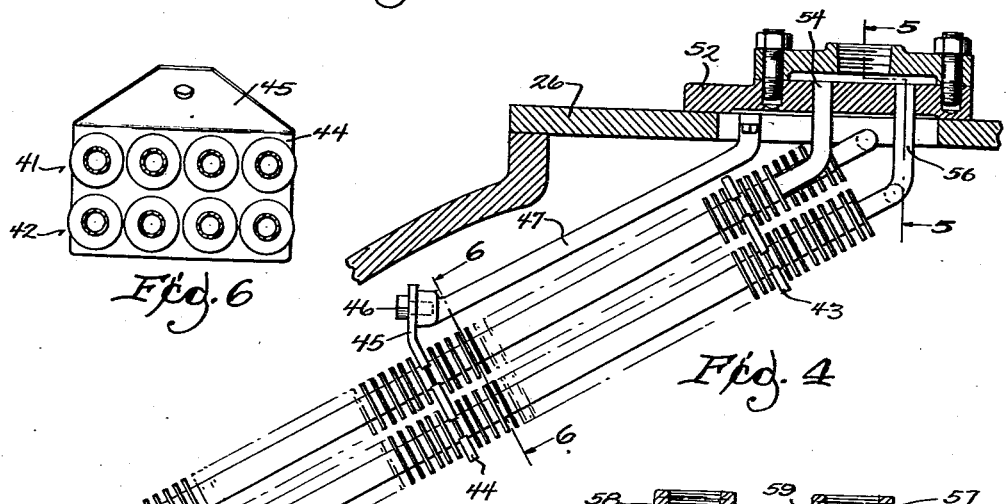
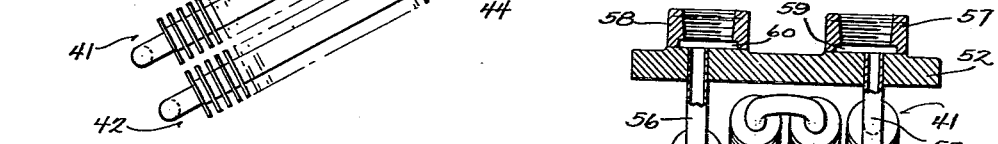
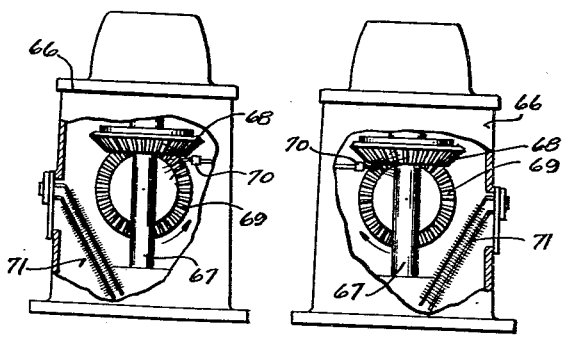

Patented Aug. 31, 1954

2,687,784

UNITED STATES PATENT OFFICE 2,687,784

LUBRICANT COOLING FOR GEAR SETS

Herman H. Klackner, Milwaukee, Wis., assignor to The Falk Corporation, Milwaukee, Wis., a corporation of Wisconsin Application May 31, 1951, Serial No. 229,201

5 Claims. (Cl. 184—104)

This invention relates to power transmission gear sets of a type widely used throughout industry and particularly to coolers therefor.

Gear sets of this type, as currently designed, are normally capable of operating at efficiencies of between 97% and 99%, but the power losses, though relatively small, are evidenced by heat generated largely in the bearings and at the mesh points of the gears and which, if not effectively and continuously dissipated, causes a temperature rise in the lubricating oil seriously impairing the lubricating properties thereof. In many instances this condition materially limits the power transmitting capacity of the gear set.

This problem has long been recognized and the many attempts heretofore made to solve it, though helpful, have not proven entirely successful. For instance, water jackets or cooling coils have been used heretofore in the base of a gear set housing to extract heat from the supply bath of lubricant commonly maintained therein; but the rate of heat dissipation by such means is seriously limited by reason of the low heat conductivity of oil. It has also been proposed to provide a heat exchanger within the housing and having cooling surfaces positioned to receive lubricant thrown from the gears, but as heretofore constructed and arranged, such heat exchangers have not attained any practical success.

The present invention has to do particularly with gear set coolers of the type last mentioned and an object thereof is to materially increase the effectiveness thereof by utilizing to advantage and in a novel manner certain conditions present within a gear set housing.

This I have accomplished by the use of a heat exchanger having a multiplicity of fins so arranged as to intercept and break up globules or droplets of oil thrown from an adjacent oil laden gear in a manner to reduce such globules to a fine condition and to spread the same over the cooling surfaces of the heat exchanger.

The effectiveness of a heat exchanger thus constructed and arranged has been found to be materially increased when placed within the windage induced by rotation of the adjacent gear, such windage functioning to produce a kind of continuous scouring action by which the cooled oil is continuously removed from the surfaces of the heat exchanger.

It has also been found that this desirable oil shedding condition is enhanced when the heat exchanger is so disposed that the fins thereof are inclined or sloping so as to provide effective drip surfaces.

Objects and advantages other than those above set forth will be apparent from the following description when read in connection with the accompanying drawing in which:

Fig. 4 is a fragment of a gear set housing such as shown in Fig. 2, partially in section, and with a side elevation of a particular construction of heat exchanger mounted in the gear set housing.

Fig. 5 is a top plan view of the heat exchanger of Fig. 4 with a portion thereof cut away on the broken line 5—5 of Fig. 4.

Fig. 6 is a cross section of the heat exchanger on the plane of line 6—6 of Fig. 4.

Fig. 7 is an end elevation of the heat exchanger of Fig. 4 with portions thereof broken away for illustration of the path of flow of coolant therethrough.

Figure 1:
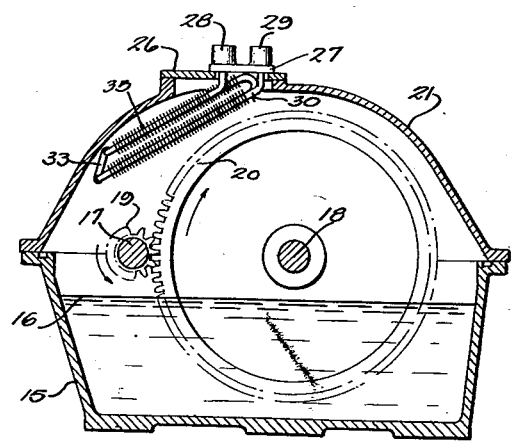
Fig. 1 is a vertical sectional diagrammatic view of a gear set with a heat exchanger therein, to show the relationship of the various elements of the gear set and the heat exchanger.

Fig. 8 is a diagrammatic view of a vertical shaft right angle gear set for one direction of rotation and shows the manner of supplying liquid to the gearing and of applying a heat exchanger to such gear set; and Fig. 9 is a view similar to Fig. 8 by showing the relationship of the lubricant supply nozzle and the heat exchanger to the gearing upon rotation of the gearing in a direction opposite from that shown in Fig. 8.

The gear set shown includes a housing which supports and encloses a plurality of meshing gears and contains a pool of oil through which at least one of the gears dips so as to lift oil from the pool as a lubricant for the meshing gear teeth and the gear set bearings. Rotation of the gears in the direction indicated by arrows on Figs. 1 and 2 of the drawing herein, causes the meshing portions of the gear teeth to force the oil from between the gear teeth and to throw the oil toward the housing walls. A portion of the oil drains from the housing walls into channels in such walls for flow of the oil to the gear shaft bearings and therefrom back to the pool in a manner well known in the art.

An externally finned, tubular heat exchanger is mounted within the housing in position to continuously intercept oil thrown from the oil-pickup gear, to break up and cool the same, and to continuously shed the cooled oil therefrom in a manner such as will be hereinafter more fully described.

Referring to the drawing by reference numerals in which the same numerals designate like parts, a housing lower half 15 contains a pool of oil of which the level is indicated at 16. The housing portion 15 receives portions of bearings in which are supported shafts 17, 18 on which are fixed gears 19, 20. Gear 19 is the driving gear which is of relatively small diameter and gear 20 is the driven gear and is of relatively large diameter so that it may dip into the oil pool for a considerable distance. A housing upper half 21 seats on the lower half of the housing and has bearing portions coacting with the previously mentioned bearings for supporting the shafts.

Figure 2:
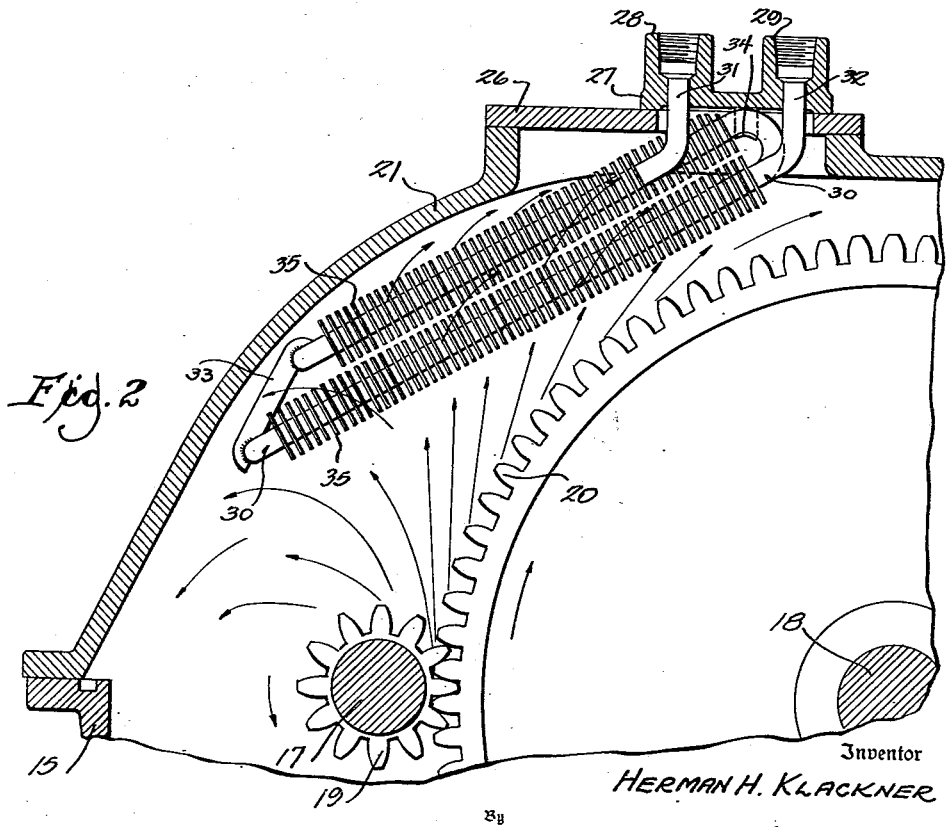
Fig. 2 is an enlarged fragment of Fig. 1 with lines thereon to show the actions occurring in the present construction.

Assuming that the gears 19, 20 rotate in the direction of the arrows shown in Figs. 1 and 2, the gear 20 lifts oil from the pool and the oil is forced from between the gear teeth upon meshing of such teeth with the teeth of gear 19. The oil is forced toward the peripheral and side edges of the gear teeth and is thrown from both the gears through the space in the upper housing in trajectories generally indicated by the arrows in Fig. 2.

The upper half of the housing 21 has an opening which extends from adjacent a vertical plane through the axis of the shaft 18 and hence over portions of both gears. A cover structure closes such opening, the cover shown in Figs. 1–3 comprising a plate 26 with an aperture therethrough and a plate 27 adapted to seat and be fixed on the plate 26 and to close the aperture therethrough, the plate 27 being provided with bosses 28 and 29 having apertures therethrough. Plate 27 supports a heat exchanger comprising coils or loops of tubing generally designated 30, the tubing being bent on itself to provide lengths of tubing in substantially parallel relation and having the ends 31, 32 thereof secured in the apertures in the plate 27 for at least partially supporting the tubing.

The bends or turns of the tubing are joined at one end by a strap 33 for keeping the tubing loops in spaced relation and a clip 34 is removably fixed to plate 27 for receiving one of the tubing turns to aid in supporting the heat exchanger. At least the straight lengths of the tubing are provided with fins 35 extending from the tubing at right angles to the axis of the lengths and in relatively closely spaced parallel relation and for a greater than usual distance from the tubes so that the heat exchanger occupies a large portion of the free space in the housing above and to all sides of the mesh line of the gears. The heat exchanger extends at an angle to the horizontal within the gear housing. It will be seen that the heat exchanger tubes and fins are at an angle to the average path of travel of the oil thrown from the gears.

Another form of heat exchanger of greater capacity is shown in Figs. 4, 5, 6 and 7 in which the tubing is arranged in two groups of four straight lengths each, such groups being designated 41 and 42. The groups of tubing are held in a predetermined relationship by spacer plates 43 and 44, the plate 44 having an extension 45 with a hole for receiving a bolt 46 passing through a bracket 47 from a cover plate 52 for the opening in the housing.

In addition to the supporting function performed by the plates 43, 44, the heat exchanger is also supported by fixing the ends of the several groups of tubing lengths in the plate 52 to be fixed on and to close the aperture in the cover plate 26. The ends of group 41 of the tubes are indicated at 53 and 54 and the ends of the group 42 of the tubes are indicated at 55 and 56. Plates 57 and 58 are provided with the respective channels 59 and 60 and are adapted to be fixed on the cover plate 52 in such manner that each channel together with an aperture through the plate to such channel, provides a conduit or manifold for the supply or discharge of coolant to the groups of tubes. Assuming that coolant is supplied to plate 57, it will thus be seen that the coolant flows from manifold 59 to the inlet ends 53 and 55 of the two groups of tubes. After passing through the groups of tubes, the coolant discharges by way of two bends 54 and 56 into the manifold 60 and therefrom through the aperture in the plate 58. It will thus be seen that the heat exchanger groups 41, 42 receive their supply of coolant in hydraulic parallel and at the same temperature.

Figure 3:
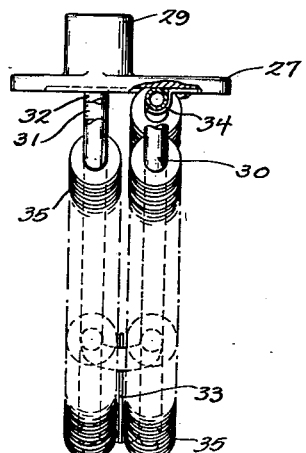
Fig. 3 is an end elevation of the heat exchanger, with portions thereof broken away to show the mounting of the heat exchanger tubing on a portion of the cover plate of the gear set.

The tubes of the heat exchanger shown in Figs. 1, 2 and 3 are of different lengths and are so located that the shorter tube is nearest the housing wall opposite the peripheries of the gears. The coolant is circulated at such rate as to discharge from the two tube loops at approximately the same temperature so that no thermal circulation of the coolant occurs in the channel into which the tube loops discharge, thus avoiding hydraulic effects which might interfere with the flow of the cooling medium.

A heat exchanger constructed and arranged in the manner herein shown and described has proven to be surprisingly effective as a gear set cooler, the remarkable results attained thereby having been demonstrated by laboratory tests and confirmed by actual experience in various industrial applications of gear sets thus equipped. The application of such units to gear sets has greatly increased the power transmitting capacity of such sets and made possible continuous operation thereof under such loads without increasing the temperature thereof to a dangerous level. These remarkable results are attributable to the conditions hereinafter noted.

It will be noted first that in both forms of heat exchanger above described the heat exchanger is disposed rather close to but radially spaced from the gear 20 and extends substantially tangentially or peripherally thereof with the fins projecting toward the gear. Thus disposed, the heat exchanger receives oil thrown from the gear. The multiplicity of narrow edged fins thereof functioning to break up the oil thus received, to thus reduce the same to a fine condition and to spread the same as a thin film over the exposed cooling surfaces. These conditions are conducive to rapid and substantially instantaneous cooling.

Moreover, it will be noted that, thus positioned, the heat exchanger is disposed within or along the path of air flow normally resulting from the windage effect induced by rotation of the gear 20. This condition results in a continuous scouring of the heat exchanger surfaces and consequent continuous removal of the cooled oil therefrom. This continuous oil removal is an important function in that it avoids oil clogging and assures maintenance of a desirably thin oil-film condition on the cooling surfaces. Furthermore, the fact that the surfaces of the several fins are inclined or sloping, as shown, they function as drip surfaces thereby aiding in the desirable oil shedding action.

It is believed that the above-noted oil-reducing film-forming function of the several fins, whereby the continuously received oil is reduced to a condition best suited for instantaneous cooling, together with the continuous shedding of the cooled oil induced by the windage and aided by the drip-surface function of the fins, adequately explain the surprisingly effective results attained.

The present invention is applicable to all types of horizontal shaft gearing and is also applicable to vertical shaft right-angle gear transmissions as is shown in Figs. 8 and 9. In such figures, a casing 66 supports a vertical shaft 67 on which is mounted a gear 68. The gear 68 meshes with a gear 69 on a shaft at right angles to the vertical shaft 67. In such transmissions lubricant is preferably supplied to the meshing points of the gears by one or more nozzles indicated at 70 which receive the lubricant under pressure and spray the lubricant on the gears at a point ahead of the meshing point of the gears.

When the rotation is in the direction indicated by the arrow in Fig. 8, the nozzle 70 is placed as indicated in such figure and a heat exchanger 71 is placed on the side of the gearing opposite the nozzle. The heat exchanger then receives both the spray from the nozzle which does not strike the gearing and cools the oil thrown from the gears in their rotation. When the direction of the gears is opposite to that shown in Fig. 9, the nozzle 70 and the heat exchanger 71 are placed as shown in Fig. 9 and the action and result are as described for the structure shown in Fig. 8.

Although but a few embodiments of the present invention have been illustrated and described, it will be apparent that various changes and modifications may be made therein without departing from the invention as defined in the appended claims.

I claim:

1. In a gear set having a housing and a set of lubricated intermeshing gears including a relatively large gear journalled therein, a cooler therefor comprising an elongated tubular structure adapted for the passage of a cooling medium therethrough, means for mounting said tubular structure within said housing adjacent to but radially spaced from said large gear and extending substantially tangentially thereof, whereby said tubular structure may receive substantially throughout the length thereof lubricant thrown from said gear, and said tubular structure having a multiplicity of external fins having edged surfaces positioned to intercept, break up and spread thereover the lubricant thus received from said gear.

2. In a gear set having a housing and a set of lubricated intermeshing gears including a relatively large gear journalled therein, a cooler therefor comprising an elongated tubular structure adapted for the passage of a cooling medium therethrough, means for mounting said tubular structure within said housing adjacent to but radially spaced from said large gear and extending substantially tangentially thereof, whereby said tubular structure may receive substantially throughout the length thereof lubricant thrown from said gear, and said tubular structure having a multiplicity of external fins having edged surfaces positioned to intercept, break up and spread thereover the lubricant thus received from said gear, said fin surfaces being sloped to facilitate discharge of cooled lubricant from said tubular structure.

3. In a gear set having a housing and a set of lubricated intermeshing gears including a relatively large gear journalled therein, a cooler therefor comprising an elongated tubular structure adapted for the passage of a cooling medium therethrough, means for mounting said tubular structure within said housing adjacent to but radially spaced from said large gear and extending substantially tangentially thereof along the path of windage induced by rotation of said gear, whereby said tubular structure may receive substantially throughout the length thereof lubricant thrown from said gear, and said tubular structure having a multiplicity of external fins having edged surfaces projecting toward said gear to intercept, break up and spread thereover the lubricant thus received from said gear, said fin surfaces being sloped and swept by said windage to effect discharge of cooled lubricant from said tubular structure.

4. In a gear set having a housing and a set of lubricated intermeshing gears therein, a cooler therefor comprising a tubular structure adapted for the passage of a cooling medium therethrough, said tubular structure being mounted in close proximity to the periphery of one of said gears so as to receive lubricant thrown therefrom, and said tubular structure having a longitudinal series of transverse fins projecting toward said last named gear and so positioned relative thereto so as to intercept, breakup and spread over the surfaces of said structure the lubricant thus received from said gear.

5. In a gear set having a housing and a set of intermeshing lubricated gears therein, a cooler therefor comprising a tubular structure adapted for the passage of a cooling medium therethrough, said tubular structure being mounted in close proximity to the periphery of one of said gears so as to receive lubricant thrown therefrom, said tubular structure having a longitudinal series of transverse fins positioned relative to said last mentioned gear to intercept breakup and spread over the surfaces of said structure lubricant thus received from said gear, and said finned tubular structure being spaced from the walls of said housing and exposed to the turbulent action of the windage induced by rotation of said gear thereby to effect continuous removal of cooled lubricant from said structure.

References Cited in the file of this patent

UNITED STATES PATENTS

| Number | Name | Date |
|---|---|---|
| 1,220,810 | Alquist | Mar. 27, 1917 |
| 1,610,886 | Ross | Dec. 14, 1926 |
| 1,688,158 | Steedman | Oct. 16, 1928 |
| 1,761,686 | Schloerb | June 3, 1930 |
| 1,995,288 | Acker | Mar. 26, 1935 |
| 2,615,615 | Young | Oct. 28, 1952 |

FOREIGN PATENTS

| Number | Country | Date |
|---|---|---|
| 593,265 | France | May 20, 1925 |